(12) United States Patent
Kwak et al.

(10) Patent No.: US 11,802,765 B2
(45) Date of Patent: Oct. 31, 2023

(54) APPARATUS FOR MEASURING SLOPE CHANGE AMOUNT OF STRUCTURE AND METHOD FOR MEASURING SLOPE CHANGE AMOUNT OF STRUCTURE USING SAME

(71) Applicants: KOREA INSTITUTE OF CIVIL ENGINEERING AND BUILDING TECHNOLOGY, Goyang-si (KR); UNINETEC.CORP, Seoul (KR)

(72) Inventors: Ki Seok Kwak, Seoul (KR); Jae Hyun Park, Goyang-si (KR); Moon Kyung Chung, Seoul (KR); Seung Hwan Seo, Daegu (KR); Young Hun Ko, Seoul (KR); Bongkun Kwak, Seoul (KR)

(73) Assignees: KOREA INSTITUTE OF CIVIL ENGINEERING AND BUILDING TECHNOLOGY, Goyang-si (KR); UNINETEC.CORP, Seoul (KR)

(*) Notice: Subject to any disclaimer, the term of this patent is extended or adjusted under 35 U.S.C. 154(b) by 134 days.

(21) Appl. No.: 16/979,791

(22) PCT Filed: Nov. 29, 2019

(86) PCT No.: PCT/KR2019/016749
§ 371 (c)(1),
(2) Date: Sep. 10, 2020

(87) PCT Pub. No.: WO2020/130410
PCT Pub. Date: Jun. 25, 2020

(65) Prior Publication Data
US 2021/0302160 A1    Sep. 30, 2021

(30) Foreign Application Priority Data
Dec. 21, 2018 (KR) .......... 10-2018-0167787

(51) Int. Cl.
*G01C 9/10* (2006.01)
*G01C 9/02* (2006.01)
*G01C 25/00* (2006.01)

(52) U.S. Cl.
CPC ............... *G01C 9/10* (2013.01); *G01C 9/02* (2013.01); *G01C 25/005* (2013.01); *G01C 2009/107* (2013.01)

(58) Field of Classification Search
CPC .......... G01C 9/10; G01C 9/02; G01C 25/005; G01C 2009/107; G01C 9/06; H04N 7/183; H04N 7/18
See application file for complete search history.

(56) References Cited

U.S. PATENT DOCUMENTS 5,202,559 A * 4/1993 Durst ............... G01C 9/10
200/61.45 R
5,373,153 A * 12/1994 Cumberledge .......... G01C 9/10
33/366.23

(Continued)

FOREIGN PATENT DOCUMENTS

| CN | 108469251 | 8/2018 |
| JP | 6-66563 | 3/1994 |

(Continued)

OTHER PUBLICATIONS

WO-9626416-A1: Kazumi et al. "Inclination Detecting Optical Sensor Has Light Emitter and Light Receiver, With Inclined Surface Between Them on Which Sphere Rolls to Provide Light Interruption" Aug. 1996 (Year: 1996).*

(Continued)

*Primary Examiner* — John Fitzgerald
*Assistant Examiner* — Tania Courson
(74) *Attorney, Agent, or Firm* — KILE PARK REED & HOUTTEMAN PLLC

(57) ABSTRACT

Provided is an apparatus for measuring a slope change amount of a structure, the apparatus being characterized by (Continued)

including: a bottom body (100) formed in a spherical surface having a predetermined radius of curvature; a ball (200) installed on an upper surface of the bottom body (100) and moving due to a gravitational force; and a camera (300) for imaging the bottom body (100) on which the ball (200) is located. In accordance with the present invention, there is an effect in that a slope change amount of a structure for a certain period may accurately be measured.

8 Claims, 7 Drawing Sheets

(56) References Cited

U.S. PATENT DOCUMENTS

| | | | | |
|---|---|---|---|---|
| 6,490,802 | B1 * | 12/2002 | Schutt | G01C 15/10 |
| | | | | 33/366.16 |
| 6,571,483 | B1 * | 6/2003 | Mangerson | G01C 9/10 |
| | | | | 33/366.26 |
| 6,690,457 | B2 * | 2/2004 | Yamaguchi | G01C 9/10 |
| | | | | 356/139.1 |
| 6,705,019 | B2 * | 3/2004 | Mauro | B23Q 1/50 |
| | | | | 33/569 |
| 7,161,138 | B2 * | 1/2007 | Hsu | G01D 5/342 |
| | | | | 33/366.23 |
| 7,612,877 | B2 * | 11/2009 | Lin | G01C 9/10 |
| | | | | 356/139.1 |
| 7,891,111 | B2 * | 2/2011 | Mauro | G01B 5/24 |
| | | | | 33/569 |
| 7,950,162 | B2 * | 5/2011 | Horio | G01C 9/06 |
| | | | | 33/366.23 |
| 7,975,394 | B2 * | 7/2011 | Mollmer | G01C 9/10 |
| | | | | 33/366.11 |
| 8,056,247 | B2 * | 11/2011 | Lai | G01C 9/06 |
| | | | | 33/366.23 |
| 8,089,621 | B2 * | 1/2012 | Horio | G01C 9/10 |
| | | | | 356/139 |
| 2013/0104408 | A1 | 5/2013 | Tan | |

FOREIGN PATENT DOCUMENTS

| | | |
|---|---|---|
| JP | 2000-275041 | 10/2000 |
| JP | 2002-372416 | 12/2002 |
| JP | 2006-317171 | 11/2006 |
| JP | 2007-178391 | 7/2007 |
| JP | 2011-069798 | 4/2011 |
| KR | 10-2014-0142844 | 12/2014 |
| KR | 10-1595791 | 2/2016 |
| KR | 10-2016-0144047 | 12/2016 |

OTHER PUBLICATIONS

EP-2846131-A1: Angelescu et al. "Inclinometer of Improved Precision and Manufacturing Method Thereof", Mar. 2015 (Year: 2015).*

International Search Report, with English translation, for International Application No. PCT/KR2019/016749, dated Mar. 26, 2020.

Written Opinion, with English translation, for International Application No. PCT/KR2019/016749, dated Mar. 26, 2020.

Extended European Search Report for European Patent Application No./Patent No. 19898568.1 dated Jul. 26, 2021.

* cited by examiner

APPARATUS FOR MEASURING SLOPE CHANGE AMOUNT OF STRUCTURE AND METHOD FOR MEASURING SLOPE CHANGE AMOUNT OF STRUCTURE USING SAME

TECHNICAL FIELD

The present invention relates to a construction field, and more particularly, to an apparatus which is for measuring a slope change amount of a structure and is capable of measuring a slope change amount of the structure during a certain period.

BACKGROUND ART

In order to measure the horizontality, the verticality, and the slope of an object (including facility and structure), sensors having various principles are being used. Analog levels have been used from long ago, and electronic or digital measuring instruments have been developed and measured slopes with digitalized numerals and graphics.

However, slope sensors according to related arts have mainly been used to measure the slope at the time of measurement even when fixedly installed to objects.

Although temperature compensation is performed in itself on a measured value using a temperature sensor embedded in a sensor, there is a limitation in that compensation is difficult regarding voltage characteristics, sensor durability, and the like. However, not the absolute verticality (the Leaning Tower of Pisa) with respect to the center of the earth, but the presence of a slope change amount at present with respect to the built time is very important for the stability of all facility and structures on the ground.

However, existing slope sensors have limitations in that compensation and initialization are required due to drifts according to temperatures, time, and changes in circuit (voltage), and a deviation due to a compensated value has to be present, so that the slope change amount varying over a long time period (up to several ten years) cannot be measured.

DISCLOSURE

Technical Problem

The present invention is derived to solve the above-mentioned limitations of the typical slope measuring apparatus, and provides an apparatus which is for measuring a slope change amount of a structure and is capable of accurately measuring a slope change amount of the structure during a certain period, and a method for measuring a slope change amount of the structure using the same.

The present invention also provides an apparatus which is for measuring a slope change amount of a structure and is capable of accurately measuring a slope change amount of the structure without being affected by a surrounding environment, and a method for measuring a slope change amount of the structure using the same.

The present invention also provides an apparatus which is for measuring a slope change amount of a structure, has small size, and easily installed, and a method for measuring a slope change amount of the structure using the same.

The present invention also provides an apparatus which is for measuring a slope change amount of a structure, and is capable of collecting a slope change amount in real time, and a method for measuring a slope change amount of the structure using the same.

The present invention also provides an apparatus which is for measuring a slope change amount of a structure, and is capable of checking the behavior of the overall slope of a structure using a plurality of measuring instruments, and a method for measuring a slope change amount of the structure using the same.

Technical Solution

In accordance with an exemplary embodiment, there is provided an apparatus for measuring a slope change amount of a structure, the apparatus being characterized by including: a bottom body (100) formed in a spherical surface having a predetermined radius of curvature; a ball (200) installed on an upper surface of the bottom body (100) and moving due to a gravitational force; and a camera (300) for imaging the bottom body (100) on which the ball (200) is located.

In this case, the apparatus for measuring a slope change amount of a structure may further include a transceiving unit (400) for transmitting image information (a) generated by the camera (300) to a server (10).

In addition, the apparatus for measuring a slope change amount of a structure may further include a housing (500) in which an internal space (510) is formed that accommodates the bottom body (100), the ball (200), and the camera (300).

In addition, the apparatus for measuring a slope change amount of a structure may further include a lighting apparatus (600) for providing light to the internal space (510).

In addition, the apparatus for measuring a slope change amount of a structure may further include a control unit (700) for controlling the camera (300), the transceiving unit (400), and the lighting apparatus (600).

In addition, the apparatus for measuring a slope change amount of a structure may further include a ball storing unit (520) for limiting a behavior of the ball (200) in the internal space (510).

In addition, the bottom body (100) may be located on the bottom surface of the internal space (510) and the camera (300) may be located on an upper surface of the internal space (510).

In addition, the bottom body (100) and the camera (300) may be formed in the same space.

In addition, the ball storing unit (520) may be a partition wall (521) that shields the bottom surface and the upper surface, and the partition wall (521) may be formed of a transparent material.

In accordance with another exemplary embodiment, there is provided a method for measuring a slope change amount of a structure using the apparatus for measuring the slope change amount of the structure, the method being characterized by including: a first step (S100) for imaging, by means of the camera (300), the bottom body (100) on which the ball (200) is located and generating first image information (a1) about the ball (200); and a second step (S200) for imaging, by means of the camera (300), the bottom body (100) on which the ball (200) is located and generating second image information (a2) about the ball (200).

In this case, the method for measuring a slope change amount of a structure may further include a third step (S300) in which the control unit (700) uses the first image information (a1) and the second image information (a2) to derive a value of change in the slope.

In addition, the third step (S300) may include: a position value deriving step (S310) for deriving a first position value (b1) of the ball (200) from the first image information (a1) and deriving a second position value (b2) of the ball (200) from the second image information (a2); and a change value deriving step S320 for using the first position value (b1), the second position value (b2), and the radius of curvature to derive the value of change in the slope.

In accordance with another exemplary embodiment, there is provided a computer readable recording medium which stores a program for performing a method for measuring a slope change amount of a structure.

Advantageous Effects

In accordance with the present invention, there is an effect in that a slope change amount of a structure for a certain period may accurately be measured.

In accordance with the present invention, there is an effect in that a slope change amount of a structure without being affected by the surrounding environment.

In accordance with the present invention, there is an effect in that the size of a measuring instrument may be reduced and the measuring instrument may easily be moved and installed.

In accordance with the present invention, there is an effect in that the slope change amount may be collected.

In accordance with the present invention, there is an effect in that the behavior of the overall slope of a structure may be checked using a plurality of measuring instruments.

MODE FOR INVENTION

Figure 1:
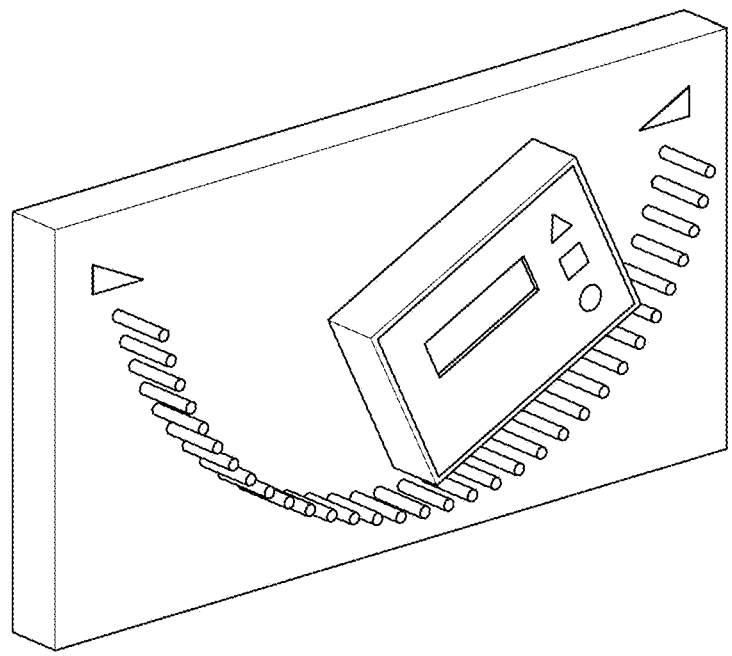
FIGS. 1 and 2 are views illustrating prior art slope measuring equipment.
Figure 2:
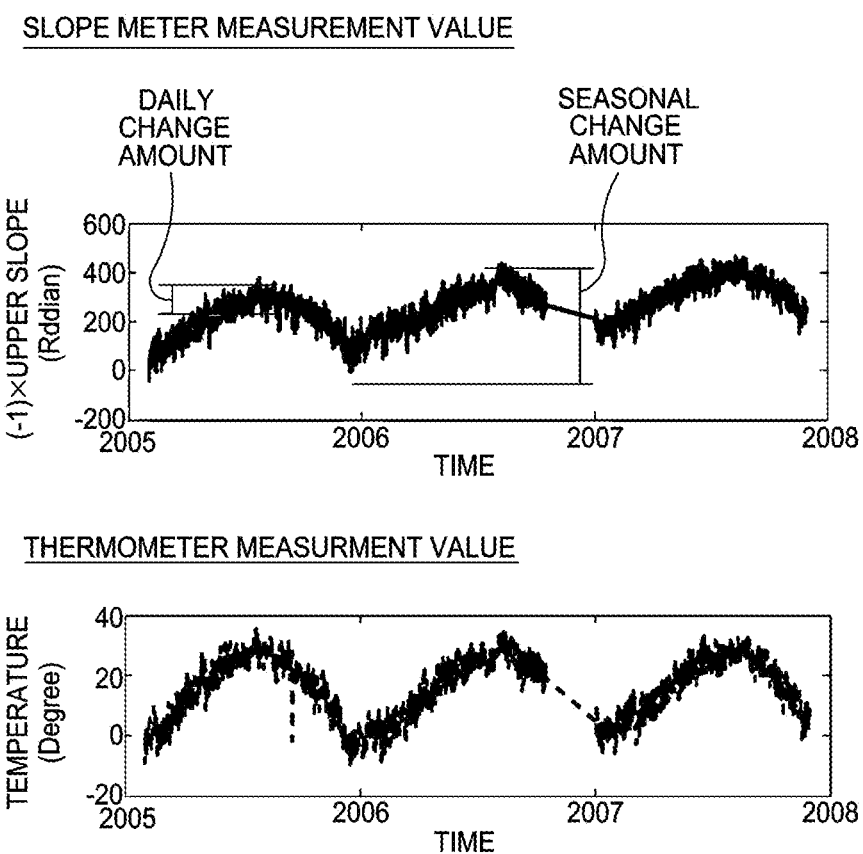

Embodiments of a slope change amount measuring apparatus for a structure according to the present invention and a slope change amount measuring method for the structure using the same will be described in detail with reference to accompanying drawings, and in describing with reference to the accompanying drawings, the same or equivalent components are referred to by the same reference symbols, and the overlapped description thereon will not be provided.

In addition, the terms such as "first", "second", and the like are merely identification symbols for discriminating the same or corresponding components, and the same or corresponding components are not limited by the terms such as "first", "second" and the like.

In addition, in the contact relationship between components, the term "coupling" will be used as a concept that not only means a case in which components are in direct physical contact with each other, but also includes a case in which another component is interposed between the components and the components are in contact with the another component.

The present invention relates to a slope change amount measuring apparatus for a structure and a slope change amount measuring method for the structure.

The term "structure" in the present invention merely illustrates a type that can be applied to a measuring instrument, and is defined such that all objects having slopes to be measured are included within the range of structures.

Existing slope (inclination) measuring methods have a limitation in that temporal variations of facility and structures cannot be found after construction because the slope at the measurement time is measured even when a sensor is fixedly installed on a measurement target. The present invention provides a slope change amount measuring method and a sensor based on image recognition in which a relative slope change amount is measured in real time after comparison with the slope at the installation time on a structure and facility. In order to compare the slope with that at the installation time which is most important to determine the stability of structures and facility and measure the slope relative slope change amount, the following major limitation should be solved.

First, when a slope sensor is fixed to a bracket or an anchor bolt at an installation place, there is a limitation in that the value of the slope sensor for the measurement target is affected by the fixing method and the error of the bracket or anchor bolt. That is, unless the accuracy and flatness of a mechanism for fixing the sensor is not guaranteed, the measured value does not indicate the actual slope of the measurement target.

Secondly, in order to measure the relative slope change amount after comparing the slope with that at the time of installation on a structure and facility, a means for storing the measurement value at the installation time of the facility is required on the sensor itself. That is, the slope change amount should also be displayed comparing with the initial measurement value stored when measuring the slope. In addition, after completing the construction of an engineering structure and facility, it is difficult to approach the fixedly installed sensor, and thus, there may be a limitation in that an initial value storing button cannot be pushed.

Thirdly, in order to measure the relative slope change amount after comparing the slope with that at the time of installation on a structure and facility, the measurement value of the slope sensor should not be affected by varying environmental factors (temperature, supplied voltage, variation in sensor characteristics due to long-term use). Existing sensor type for measuring an analog value such as electrostatic capacitance or amount of current is affected by an environmental factor, and tends to generate a temporal drift due to the characteristic of the analog value. In order to compensate this, slope compensation is performed according to temperatures by adding a temperature sensor, but there is a limitation in that although the temperature sensor also has a product deviation, and has characteristic varying with time, there is no means for correcting these.

Fourthly, due to installation on a structure or facility, there is a limit in size even when a sensing method that is not affected by an environmental change. Since being fixed to a bracket or an anchor bolt of a structure or facility, the sensor housing also has a limitation in the minimum size thereof. When the housing embedding a slope sensor is made small, there is a limitation of difficult fixation.

If a relative slope change amount may be measured compared to the slope at the installation time in order to determine stability of a structure or facility, the reliability of safety management for the structure of facility may remarkably enhanced. Although it is important to simultaneously measure the slope and the slope change amount, the solution means has not yet provided up to now. That is, in order to implement a slope change amount measuring method and a sensor which measure, in real time, a relative slope change amount compared to the slope at the time of installation on a structure or facility, the overall limitations will be solved as follows.

First, since a slope sensor is fixed to a bracket, an anchor bolt, or the like at an installation place, there is a limitation in that unless the accuracy of a mechanism for fixing the sensor on a measurement target, the measurement value does not indicate an actual slope. A measuring instrument is used instead of a fixed sensor to measure the absolute slope at reference points on a measurement target during construction. The main purpose of the fixed installation of a slope sensor is to measure, in real time, the slope varying after installation, and thus, the above limitation is solved by configuring the sensor to measure a slope change amount compared to an initial set slope value together with an absolute slope value.

Secondly, in order to measure the relative slope change amount after comparing the slope with that at the time of installation on a structure and facility, the sensor itself includes a permanent storage means (flash memory etc.) in a sensor circuit as a means for storing the measurement value at the installation time of facility. The sensor includes a processor CPU for controlling a storage means. The processor CPU is configured so that a measurement value is read from a slope measuring means, and the slope change amount compared with the stored initial slope measurement value is output to the outside together with the measurement value. After constructing an engineering structure or facility, it is difficult to approach a fixedly installed sensor, and thus, in order to solve the limitation in which an initial value storing button of the sensor cannot be pushed, a command for storing the current measurement value as the initial measurement value is configured to be transmitted via external communication line or wireless communication to the processor. A sensor housing should basically include an initial value storing button.

Thirdly, in order to measure the relative slope change amount after comparing the slope with that at the time of installation on a structure and facility, a slope measuring method should be applied in which the measurement value of the slope sensor should not be affected by varying environmental factors (temperature, supplied voltage, variation in sensor characteristics due to long-term use). The key method of a slope meter for measuring the position of a commercialized pendulum is the principle of servo accelerometer, in which a single pendulum is placed within a magnetic field of a position detector and is inclined in the gravitational force acting direction when the gravitational force is applied, and thus, when current is changed, the pendulum has a gravitational force and an electromagnetic force tending to vary in the reverse direction of the initial direction, so that when an equilibrium is established and the pendulum does not move, a current value is measured and is converted into a slope. Also, from the basic principle of a MEMS accelerometer, an electrostatic capacitance value is measured between an end of a cantilever and an electrode is measured to measure an acceleration and slope. In such methods, since an analog measurement value is basically converted into a slope, there is a limitation in that compensation for temperature and environments and initial zero point adjustment should frequently be performed. Therefore, a method for digitally measuring the position of a pendulum is required so as not to be affected by temperatures and environments. Alternatively, a digital absolute slope measuring method may be improved and applied which measures, with an image sensor, the position of light directing the earth center or a specific pattern installed on a pendulum to calculate a slope. When the above-mentioned method is applied, the slope is measured not as an analog value but as a digital coordinate value and thus, environmental influence may be removed.

Fourthly, due to installation on a structure or facility, there is a limit in size even when a sensing method that is not affected by an environmental change. Since being fixed to a bracket or an anchor bolt of a structure or facility, the sensor housing also has a limitation in the size thereof. In general, sensors to be fixed to structures and facility are being sold which have the diameters of approximately 50 mm and the thickness of approximately 40 mm. If necessary, an auxiliary plate is used to be coupled to a fixing means for facility and structures. In order to satisfy this, a digital absolute slope measuring method and a sensor are improved and applied which measures the position of a ball that freely oscillates inside a sphere obtainable in a thin structure and directs the earth center. That is, a method may be proposed in which a ball (including a steel ball) that freely oscillates inside a semi-sphere is installed, and the position (coordinate of the center or outer periphery of a circle) of the ball is measured because the ball moves toward the earth center. In this case, a slope is calculated by using the movement distance of the ball from the center of the semi-sphere in an X-axis and a Y-axis and the radius of curvature of the semi-sphere. When the pixel size of an image sensor (camera sensor) is approximately 1 μm (the pixel size of an ⅕ inch 5M image sensor is approximately 1.12 μm) and the radius of curvature is approximately 50 mm, the measurement may be performed up to a measurement accuracy of approximately arctan (1 μm/50 mm)=0.0001 degree. When the radius of curvature increases due to a limit in case size, a sphere having the size of the semi-sphere may not be used, and a sphere may be manufactured in a form of using a portion of the sphere and manufactured in a thin type. Since a ball oscillating with respect to the central axis of the semi-sphere moves very sensitively even by external shock, vibration, seismic wave, or the like, the ball may be used even for measuring sensors (shock sensor, vibration sensor, seismic sensor, etc.) of the relevant field.

Hereinafter, a slope change amount measuring apparatus will be described with reference to the accompanying drawings according to an exemplary embodiment of the present invention.

Figure 3:
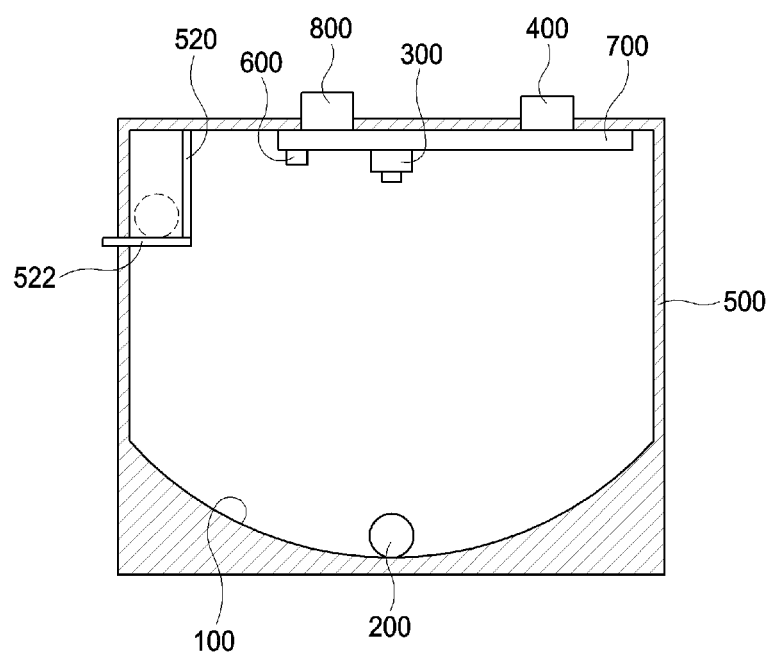
FIG. 3 is a configuration view of a slope change amount measuring apparatus according to an embodiment of the present invention.

A slope change amount measuring apparatus according to the present invention may include: a bottom body 100 formed in a spherical surface having a predetermined radius of curvature; a ball 200 installed on the bottom body 100 and moving due to the gravitational force; and a camera 300 for imaging the bottom body 100 on which the ball 200 is located (FIG. 3).

The bottom body 100, the ball 200, and the camera 300 is accommodated in an internal space 510 of a housing 500 in which the internal space 510 is formed (FIG. 3).

In addition, an imaging button 800 may further be included that controls the operation of the camera 300.

When the slope of a structure varies, the position of the ball 200 also varies due to the gravitational force, and thus, the slope change amount of the structure may be measured by deriving the position change value of the ball 200.

In the bottom body 100 formed in a spherical surface, the center of the freely-oscillating ball 200 always directs toward the gravitational direction, and thus, slopes may be simultaneously measured in two axis directions by imaging the position of the ball 200 using the camera 300. Such a configuration provides the following advantages.

First, fixedly installing a slope sensor on to a structure of facility has a main purpose of measuring a slope varying after installation, and thus, an absolute slope value may be measured along with the slope change amount compared to the initially set slope value, and there is an effect of enhancing the reliability of structure safety determination.

Secondly, in order to compare the slope at the installation time and then measure the slope relative slope change amount, a sensor itself is configured to include therein a permanent storage means for storing the measurement value at the installation time of facility and a processor CPU for controlling the storage means, and thus, there is an effect of reducing a measurement system construction cost because a separate data logger apparatus is not required.

Thirdly, a command for storing the current measurement value as an initial measurement value is configured to be transmitted to the processor of a sensor circuit via external communication (or wireless communication), so that the limitation is solved in which the fixedly installed sensor cannot be accessed after completing the construction of an engineering structure and facility.

Fourthly, a slope is directly measured not as an analog value but as a digital value, and there is basically no drift due to temperature, time, and supplied power and the measurement value is always accurate and stable, and thus, there is an effect of being applicable to fields such as construction and civil engineering fields in which the range of fluctuation of external environment is large and a structure safety diagnosis field in which a sensor is installed in a position where correction is difficult.

Fifthly, since a ball 100 is used which freely oscillates in the bottom body 100 formed in a spherical surface, the apparatus may have a small size, and the measurement range may be increased, and the adjustment of accuracy may be easily performed. Thus, the apparatus may also be used to accurately measure the slope of a telephone pole or the like.

In addition, when including a display means, the apparatus may also be applied to a machine tool or the like which should accurately maintain the horizontality.

Sixthly, since a plastic ball may be used which freely oscillates inside a semi-sphere, the influence of external radio waves is minimized and the apparatus may also be applied to a field such as a power-line tower in which a strong radio wave is generated.

A slope change amount measuring apparatus according to the present invention may further include a lighting apparatus 600 for providing light to the internal space 510.

In addition, the apparatus may further include a ball storing unit 520 which limits the behavior of the ball 200 in the internal space 510 (FIG. 3). As the ball 200 moves in the internal space 510, the lighting apparatus 600 or the camera may be damaged, and thus, the ball storing part 520 is included as a component which can limit the behavior the ball 200 at the time such as during movement of the apparatus.

According to an embodiment of the present invention, the bottom body 100 and the camera 300 are formed in the same space, and the ball storing part 520 may be a storage barrel 522 formed on the side surface of the internal space 510.

In this case, since there is no separate object between the camera 300 and the bottom body 100, a high-quality captured image may be acquired.

According to another embodiment of the present invention, when a bottom body 100 may be located on the bottom surface of the internal space 510 and the camera 300 is located on the upper surface of the internal space 510, the ball storing part 520 may be formed as a partition wall that shields the bottom surface and the upper surface.

Figure 4:
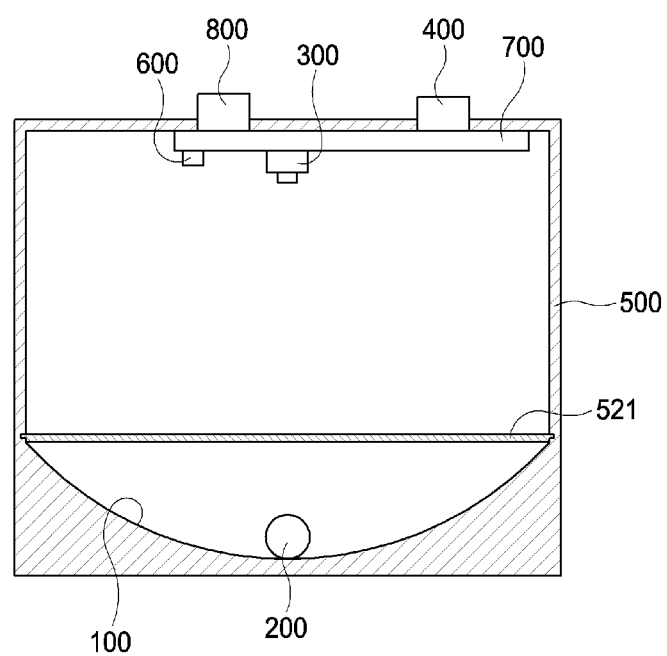
FIG. 4 is a configuration view of a slope change amount measuring apparatus according to another embodiment of the present invention.
Figure 5:
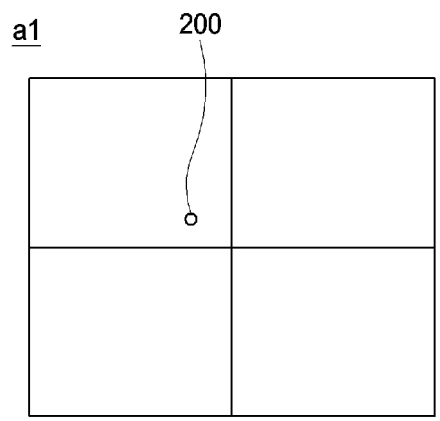
FIG. 5 is a view illustrating first image information by a camera according to an embodiment to the present invention.
Figure 6:
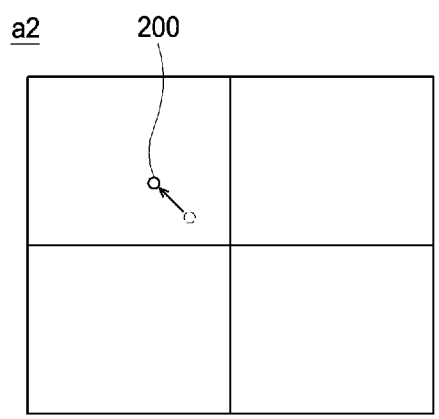
FIG. 6 is a view illustrating second image information acquired by a camera according to an embodiment to the present invention.
Figure 7:
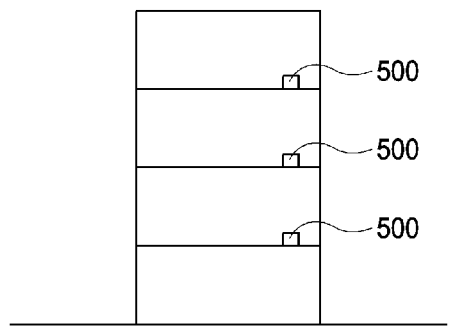
FIGS. 7 and 8 are views illustrating the slope change amount of the entire structure using a slope change amount measuring apparatus according to an embodiment of the present invention.
Figure 8:
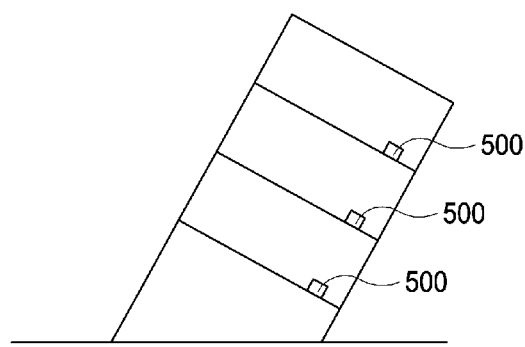
Figure 9:
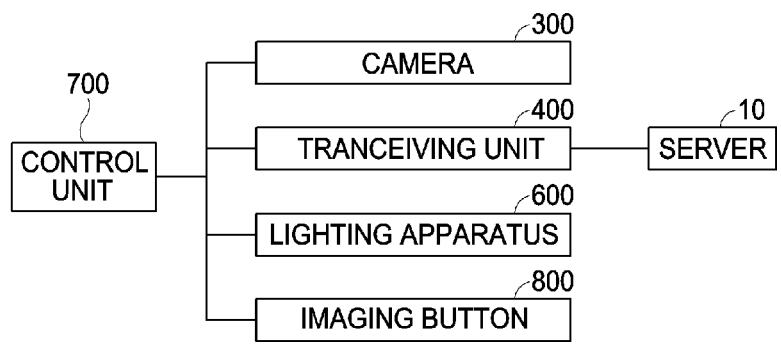
FIG. 9 is a configuration view of a slope change amount measuring apparatus according to an embodiment of the present invention.

In this case, the partition wall 521 is favorably formed as a transparent body so that the camera 300 may image the bottom body 100 (FIG. 4).

Figure 10:
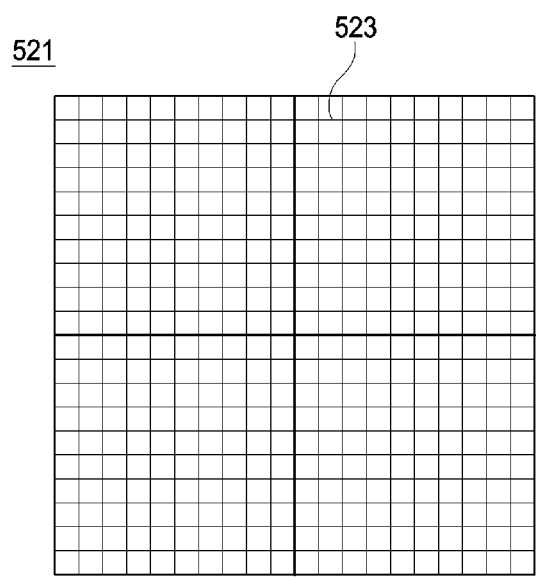
FIG. 10 is a view illustrating a measurement reference line formed on a partition wall according to another embodiment of the present invention.

In this case, a measurement reference line 523 may be provided which may determine the position of the ball 200 (FIG. 10).

A slope change amount measuring apparatus for a structure according to the present invention may further include a transceiving unit 400 which transmits image information a generated by the camera 300 to a server 10.

In addition, a control unit 700 may further be included which controls the camera 300, the transceiving unit 400 and the lighting apparatus 600.

In this case, it is possible to confirm whether the position of the ball 200 is moved in real time or for each set period by automatically transmitting the image information acquired by the camera 300 to the server 10.

Hereinafter, a method for measuring the slope change amount of a structure using a slope change amount measuring apparatus for a structure according to an embodiment of the present invention will be described.

A method for measuring the slope change amount of a structure includes: a first step S100 for imaging a bottom body 100, on which a ball 200 is located, with a camera 300 and generating first image information a1 of the ball 200; a second step S200 for imaging the bottom body 100, on which the ball is located, with the camera 300 after the first step S100 and generating second image information a2 of the ball 200; and a third step S300 in which a control unit 700 uses the first image information a1 and the second image information a2 to derive a slope change value.

In this case, the third step S300 may include: a position value deriving step S310 for deriving a first position value b1 of the ball 200 from the first image information a1 and deriving a second position value b2 of the ball 200 from the second image information a2; and a change value deriving step S320 for using the first position value b1, the second position value b2, and a radius of curvature to derive a slope change value.

In the change value deriving step S320, the slope change value may be derived through the following method.

A slope analysis method according to the position of the ball 200 which freely oscillates in the bottom body 100 formed as a semi-sphere surface is as follows.

In order to calculate a slope by measuring, with a camera sensor, the position of the ball 200 which freely oscillates in the semi-sphere surface bottom body 100, a theoretical analysis is required regarding two fields. 1) The position of the ball in the semi-sphere coordinates system (world coordinate system) should be converted into camera coordinates corresponding to the position, and 2) a normal vector of a h-projection surface (height h from the bottom surface) according to the position of the ball which freely oscillates in the semi-sphere surface should be calculated.

The method for measuring a slope change amount for a structure according to an embodiment of the present invention may be implemented as a form of a program command that can be executed through various computing means and be recorded in a computer readable medium.

The computer-readable medium may include each of a program instruction, a data file, a data structure, and the like, or a combination thereof. The program instructions recorded in the medium may be specially designed and configured for the present invention or also be well known and usable to a person skilled in computer software. Examples of the computer readable recording media include magnetic media such as hard disks, floppy disks or magnetic tapes, optical media such as CD-ROM or DVD, magneto-optical media such as floptical disks, ROM, RAM, or flash memory, which are specially configured to store and execute program instructions.

Examples of the program instructions include not only a machine language code such as those made by a compiler, but also a high-level language code which can be executed by a computer using an interpreter or the like. The hardware devices may be configured to operate as one or more software modules in order to execute the operation of the present invention, and vise versa.

The above-disclosed subject matter merely describes some portions of preferred embodiments that can be implemented by the present invention. Therefore, as is well known, the scope of the invention shall not be construed as limited to the embodiments above, and technical ideas that share a base with the aforementioned technical idea of the present invention would all be included in the scope of the invention.

INDUSTRIAL APPLICABILITY

The present invention proposes a specific configuration for measuring the slope of a structure and thus has industrial applicability.

What is claimed is:

1. An apparatus for measuring a slope change amount of a structure, the apparatus comprising:
    a bottom body (100) formed in a spherical surface having a predetermined radius of curvature;
    a ball (200) installed on an upper surface of the bottom body (100) and moving due to a gravitational force; and
    a camera (300) for imaging the bottom body (100) on which the ball (200) is located, the apparatus further including:
    a housing (500) in which an internal space (510) is formed that accommodates the bottom body (100), the ball (200), and the camera (300); and
    a ball storing unit (520) for limiting a behavior of the ball (200) in the internal space (510), wherein:
    the bottom body (100) is located on a bottom surface of the internal space (510);
    the camera (300) is located on an upper surface of the internal space (510); and
    the ball storing unit (520) is a storage barrel (522) that shields the ball (200) from the camera (300), the bottom surface and the upper surface,
    wherein:
    the storage barrel (522) is configured to immobilize the ball (200) during transport or storage of the apparatus, and
    the storage barrel (522) is configured to release the ball (200) to freefall to the bottom surface during operation of the apparatus.

2. The apparatus of claim 1, further comprising a transceiving unit (400) for transmitting image information (a) generated by the camera (300) to a server (10).

3. The apparatus of claim 1, further comprising a lighting apparatus (600) for providing light to the internal space (510).

4. The apparatus of claim 3, further comprising a control unit (700) configured to control the camera (300), the transceiving unit (400) and the lighting apparatus (600).

5. A method for measuring a slope change amount of a structure using the apparatus of claim 4 for measuring a slope change amount of a structure, the method comprising:
    a first step (S100) for imaging, by means of the camera (300), the bottom body (100) on which the ball (200) is located and generating first image information (a1) about the ball (200); and
    a second step (S200) for imaging, by means of the camera (300), the bottom body (100) on which the ball (200) is located and generating second image information (a2) about the ball (200).

6. The method of claim 5, further comprising a third step (S300) in which the control unit (700) uses the first image information (a1) and the second image information (a2) to derive a value of change in the slope.

7. The method of claim 6, wherein the third step (S300) comprises:
    a position value deriving step (S310) for deriving a first position value (b1) of the ball (200) from the first image information (a1) and deriving a second position value (b2) of the ball (200) from the second image information (a2); and
    a change value deriving step (S320) for using the first position value (b1), the second position value (b2), and the radius of curvature to derive the value of change in the slope.

8. A computer readable recording medium configured to store a program for executing the method of claim 7 for measuring a slope change amount of a structure.

* * * * *